US 6,647,392 B1

(12) United States Patent
Tagg

(10) Patent No.: US 6,647,392 B1
(45) Date of Patent: Nov. 11, 2003

(54) METHOD AND APPARATUS FOR THE REQUEST BROKERING OF STANDARDIZED REPORTS

(75) Inventor: Bradley S. Tagg, Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,941

(22) Filed: Feb. 4, 2000

(51) Int. Cl.$^7$ ............................................. G06F 17/30
(52) U.S. Cl. ............................ 707/101; 707/2; 707/4; 707/526; 709/203; 709/206; 709/217
(58) Field of Search ........................... 707/101, 2, 4, 707/104, 526; 709/203, 217, 206, 227

(56) References Cited

U.S. PATENT DOCUMENTS

| 4,454,576 A | 6/1984 | McInroy et al. ............. 364/200 |
| 4,460,975 A | 7/1984 | Torkelsen et al. ........... 364/900 |
| 5,694,608 A | 12/1997 | Shostak ....................... 395/767 |
| 5,721,908 A | 2/1998 | Lagarde et al. .............. 395/610 |
| 5,732,221 A | 3/1998 | Feldon et al. ................ 395/203 |
| 6,072,493 A | * 6/2000 | Driskell et al. .............. 345/854 |
| 6,195,653 B1 | * 2/2001 | Bleizeffer et al. ............... 707/2 |
| 6,279,033 B1 | * 8/2001 | Selvarajan et al. .......... 709/217 |
| 6,341,286 B1 | * 1/2002 | Kawano ....................... 707/101 |
| 6,360,246 B1 | * 3/2002 | Begley et al. ............... 709/203 |
| 6,377,993 B1 | * 4/2002 | Brandt et al. ................ 709/227 |
| 6,385,644 B1 | * 5/2002 | Devine et al. ............... 709/206 |
| 6,397,207 B1 | * 5/2002 | Bleizeffer et al. ............... 707/2 |

* cited by examiner

Primary Examiner—Jean M. Corrielus
(74) Attorney, Agent, or Firm—Scully, Scott, Murphy & Presser; William E. Schiesser

(57) ABSTRACT

A report catalog tool and a method for selecting and requesting a report from a catalog of standardized reports. The catalog tool comprises a distributable database having one or more documents, each said document representing a report, and attributes for said report indicating a location where logic resides for said report and a data source to be used for said report. The catalog tool further comprises means for allowing a user to order and configure a requested report, means for formatting said order as a transaction on a target system at said location and using said data source, and means for running said transaction to generate said requested report and to return said requested report to said user.

19 Claims, 6 Drawing Sheets

| Name of Parameter | Value for Parameter | |
|---|---|---|
| THIS_MONTH | ▶ | HELP |
| THRU_MONTH | ▶ | HELP |
| YEAR_END_MONTH | ▶ | HELP |
| PRACTICE_CODE | ▶ | HELP |
| BUSINESS_TYPE | ▶ | HELP |
| GEOGRAPHY_CODE | ▶ | HELP |

Submit Request

Required: Select one from the list of choices and then fill in the parameters

FIG. 5
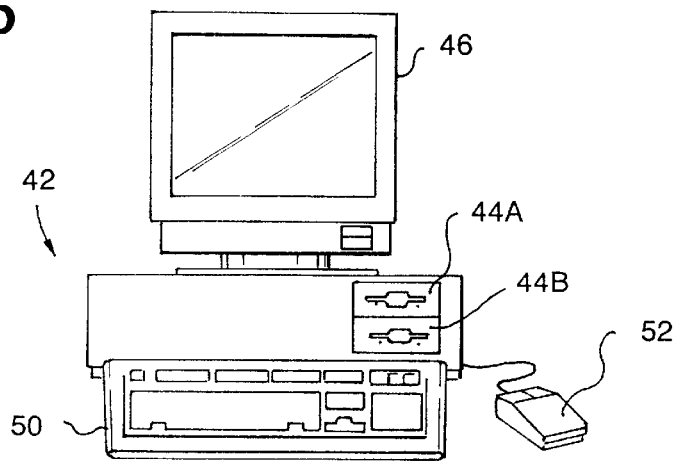
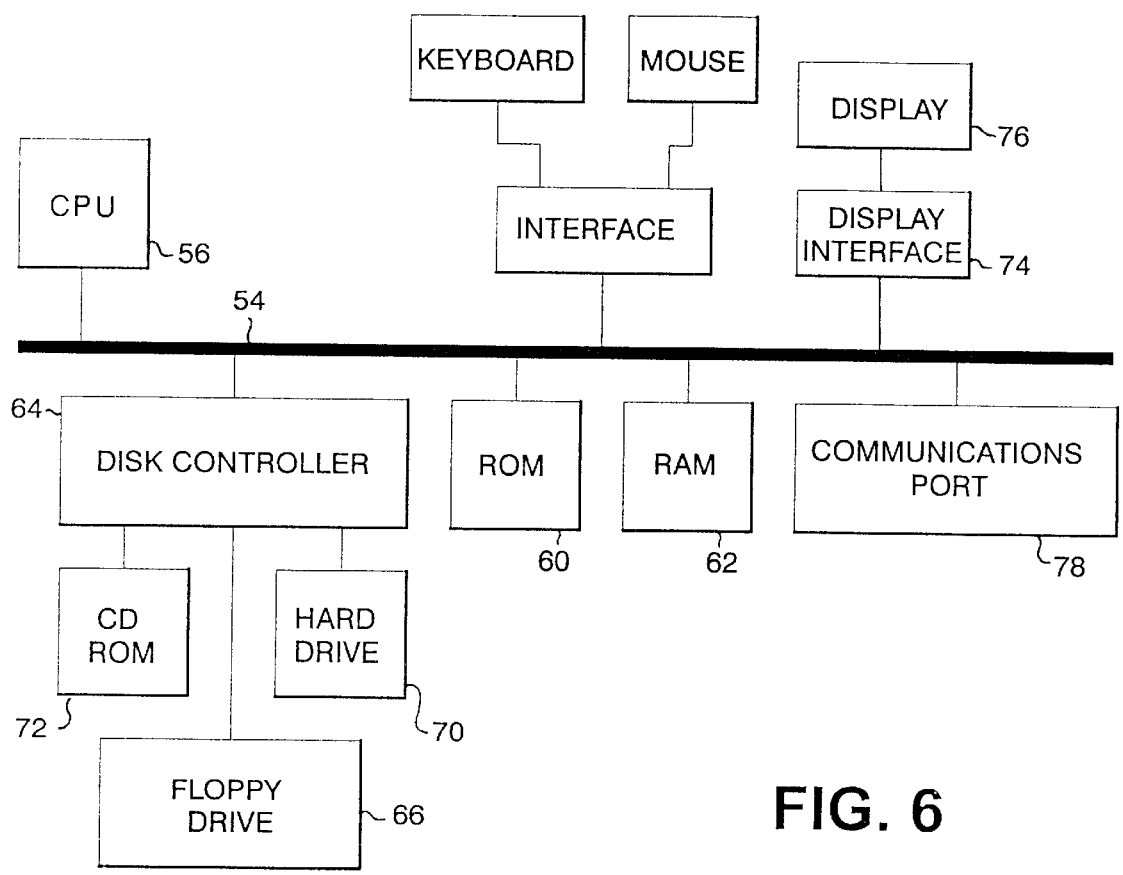
FIG. 6

METHOD AND APPARATUS FOR THE REQUEST BROKERING OF STANDARDIZED REPORTS

BACKGROUND OF THE INVENTION

This invention generally relates to the management and request brokering of standardized reports. More specifically, the present invention relates to a method and apparatus for selecting and requesting a report from a catalog of standardized reports.

Many businesses and other organizations store an enormous amount of data in computer databases. There are many difficulties, however, with managing and obtaining access to that data. For example, many businesses do not have a single source or system to obtain standardized business reports. Also, generally, there is a lack of process related to how reports are created and made available to end users, and there is a lack of report categorization and taxonomy associated to support decisions on which report to request.

In addition, often there is an inability for the user to see what a report will look like before requesting the report, and an inability to support parameter driven requests against standardized business reports. Conventional procedures are not able to define and request reports against multiple sources from the same report catalog. Moreover, in many cases, a user needs to be connected to a network in order to request reports, and the technology used to create the report drives the technology used to request the report.

There clearly exists a need for a method and apparatus that allows a business to create a catalog of standardized business reports and to provide that report catalog to end users for use in selecting and requesting a report.

SUMMARY OF THE INVENTION

An object of this invention is to provide a method and apparatus to find, request and view reports of any nature.

Another object of the present invention is to provide a product that delivers a method and set of functions to define new reports and to make them available to sets of users.

A further object of this invention is to provide one single application to define, to select, and from which to request business reports.

Still another object of the invention is to provide a standard procedure for defining and launching business reports.

These and other objectives are attained with a report catalog tool and a method for selecting and requesting a report from a catalog of standardized reports. The catalog tool comprises a distributable database having one or more documents, each said document representing a report, and attributes for said report indicating a location where logic resides for said report and a data source to be used for said report. The catalog tool further comprises means for allowing a user to order and configure a requested report, means for formatting said order as a transaction on a target system at said location and using said data source, and means for running said transaction to generate said requested report and to return said requested report to said user.

Preferably, the report catalog contains attributes for each report that define:

a graphical depiction of the report;

a categorization of the report (where categories are defined by a super administrator for each report catalog);

a set of parameters that the report will receive as input and which will be used to generate the report;

valid values for those parameters;

who can access the report; and a set of formats for the returned report.

With the preferred embodiment of this invention, an end user is able to see all of the available reports, and to submit a report request from the catalog if that report is available to the user (based on the access granted to the user). This report request may be used to indicate what parameters they would like to use in generating the report, and to indicate how they would like the report delivered back to them. Further, the end user is able to store reports and parameter definitions as documents, such as Lotus Notes documents.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 3 and 4 are computer display screens that may be used in the practice of this invention.

FIGS. 5 and 6 show a computer system that may be used in the invention.

DETAILED DESCRIPTION OF THE PREFERRED EMBODIMENTS

Figure 1:
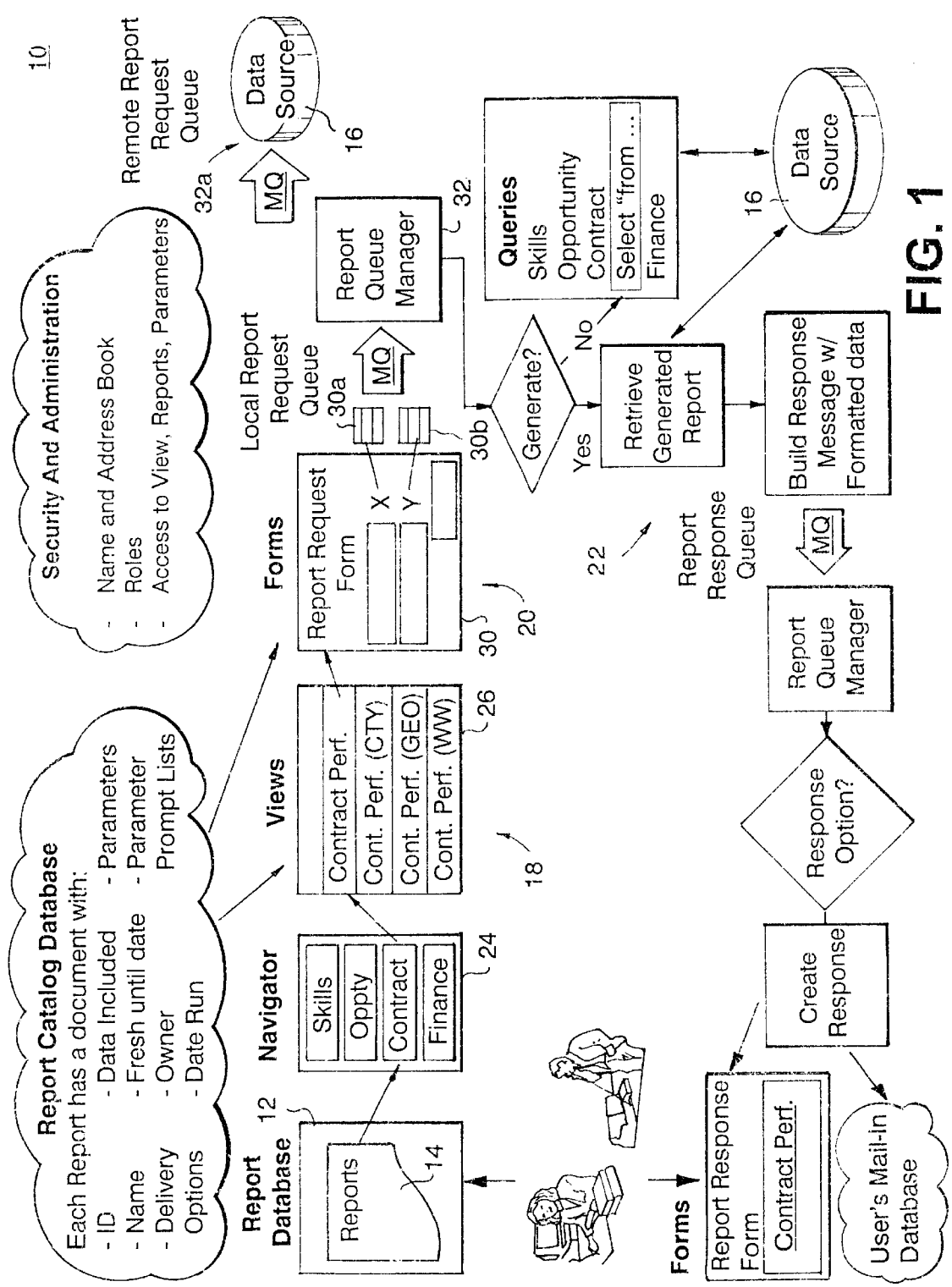
FIG. 1 diagrammatically illustrates the operation of a report catalog tool embodying this invention.
Figure 2:
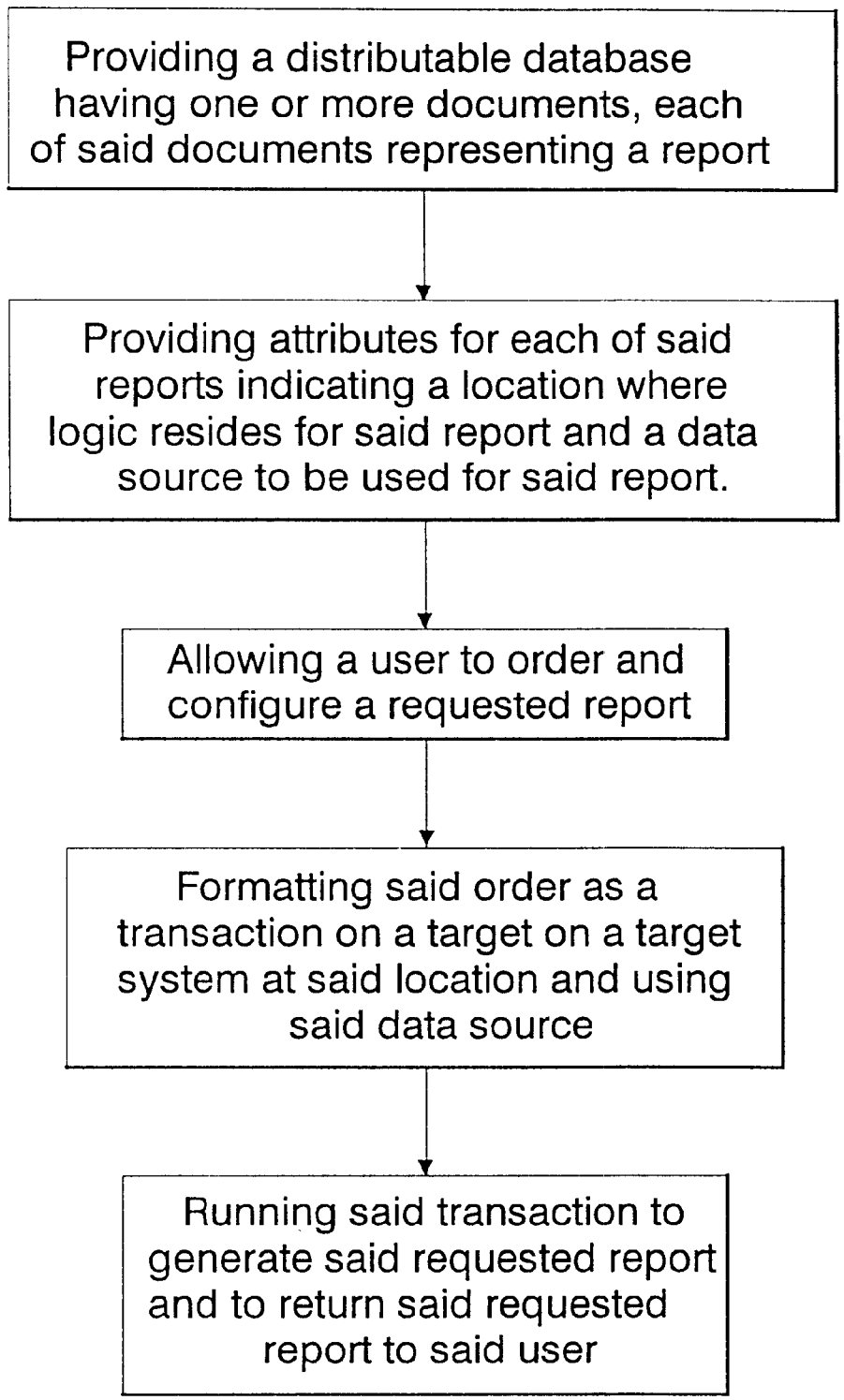
FIG. 2 is a flow chart outlining a preferred method for performing the present invention.

FIGS. 1 and 2 illustrate a reports catalog tool and procedure. The catalog tool, generally referenced at 10, comprises a distributable database 12 having one or more documents, with each of these documents representing a report 14. Attributes are provided for each report that indicate a location where logic resides for the report and a data source 16 to be used for the report. The catalog tool 10 further comprises means 18 for allowing a user to order and configure a requested report, and means 20 for formatting that order as a transaction on a target system at the indicated location and using the indicated data source. Means 22 are also provided for running that transaction to generate the requested report and to return the requested report to the user.

Figure 3:
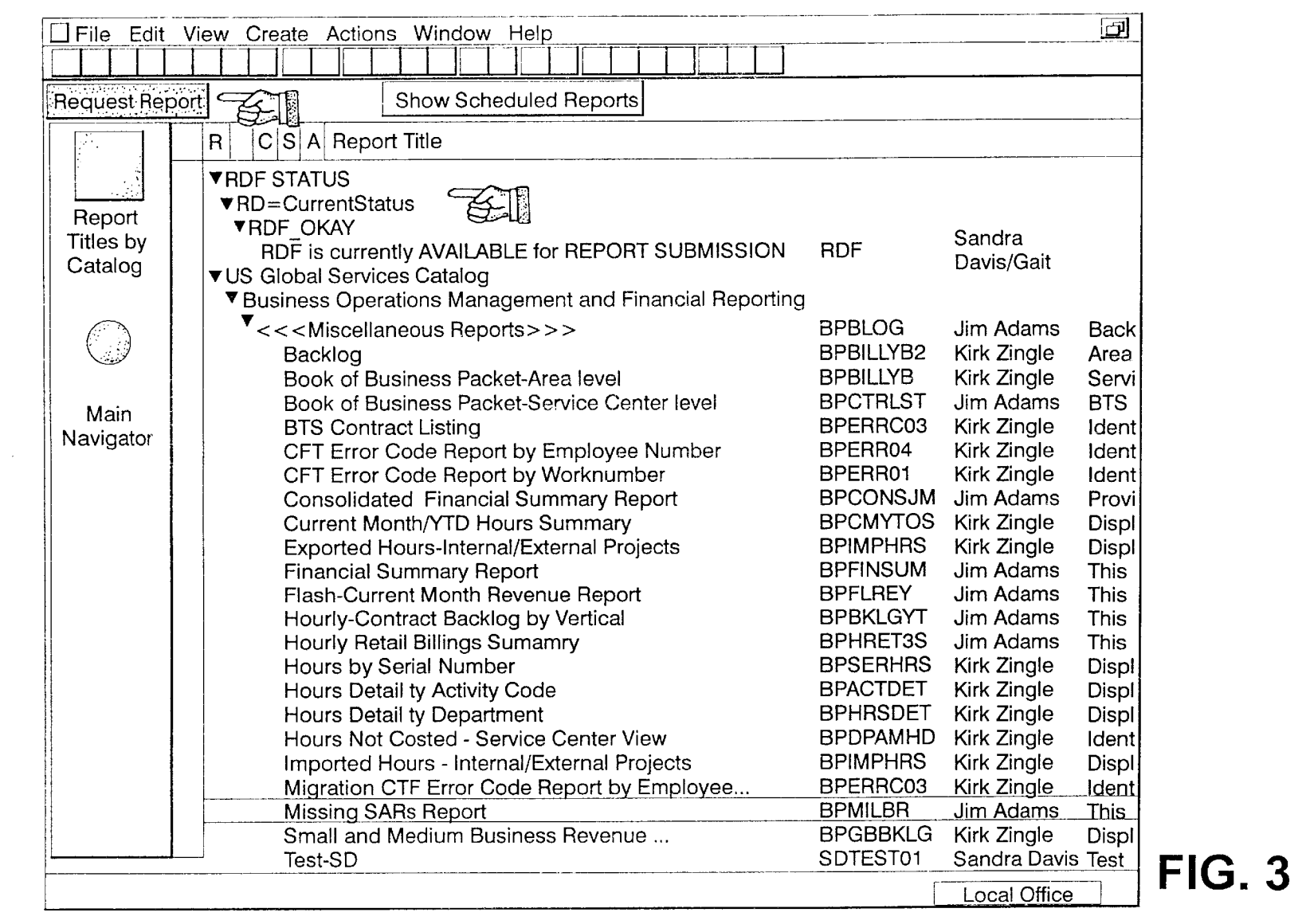

More specifically, in the operation of the preferred embodiment of the present invention, a user accesses a report database 12, which identifies various general types 24 of available reports. The user selects the desired general type of report, and in response, the user is provided with a list 26 of more specific types of reports in that general category. FIG. 3 shows, as an example, a computer view that shows a list of specific types of reports available in a general category.

After indicating the more specific type of report in which the user is interested, a form 30 is provided to the user, asking the user to identify specific parameters of interest or values for those parameters, and to identify how the response is to be given to the user. FIG. 4 shows, for example, a computer view that may be used in the input of values for parameters. The user may be provided with prompts 30a and 30b that list possible valid parameters of interest.

The user inputs the data needed to complete the report request form 30, and the report request is then sent to a queue manager 32 that has access to the data source 16 needed to respond to the report request. That queue manager 32, it may be noted, may be local or remote, as represented at 32a.

Upon receipt of the report request, the queue manager checks to determine if the requested report might already have been generated. If that report has already been generated, the report is retrieved, and a response message is built, with the data formatted in the requested way. If, in contrast, the report has not already been generated, the queue manager queries the data source to obtain the data needed for the report; and then, after that needed data are obtained, a response message is built with the data in the requested format.

The response is sent to a report queue manager, and a determination is made as to exactly how the response is to be sent back to the user. Once that determination is made, the response is created and sent back to the user. For example, the response may be sent by e-mail, or as a visual computer display.

The preferred embodiment of the invention may be considered as being comprised of three basic components. The first component is the distributable reports catalog, and, for example, the reports catalog may implemented as a Lotus Notes database. The reports catalog is made up of documents that each represent a report. Attributes are defined for each report that indicate where the report logic resides and what data source is to be used for the report. The catalog is used by report developers as well as by report requesters.

The report catalog also contains attributes for each report that define:
  a graphical depiction of the report;
  a categorization of the report (where categories are defined by a super administrator for each report catalog);
  a set of parameters that the report will receive as input and which will be used to generate the report;
  valid values for those parameters:
    who can access the report; and
    a set of formats for the returned report.

This component is also responsible for managing returned reports and presenting them to the user.

The second component is a middleware layer that uses a manager, for example, an MQ Series manager, to process a request for a report and to deliver that request to the appropriate data source. A request for a report is formatted as a transaction which includes the target system to run the transaction (report request) against. This middleware layer uses information in the request to direct the request to the data source and program that has been associated with the creation of the report (via catalog attributes). Once the report is generated (through the generation component, described below), the middleware layer renders it in the format requested and ensures that the report is directed back to the request document it was generated from.

The third component is the report generation layer. This layer receives the report request as a transaction, and processes the request by invoking the program or executable defined in the request. The report executable (for that report) is invoked using the parameters that were submitted by the user to employ as the context of the report. Parameters are included in the transaction (MQ Series message). The report is generated and returned to the middleware layer for direction back to the point of request.

With the present invention, as described above, users can navigate through various categories of reports via a categorized catalog/report view and work from this view to select a particular report to request. The database can serve as both the interface and collector of report definitions, as well as the place where reports are requested from. Users can work within the characteristics of a report (such as by selecting from the allowed parameter list). Options can be enabled for each report to deliver the report back in several formats including, for instance, Lotus 1-2-3, Adobe Acrobat, or Essbase format.

As previously mentioned, reports can also be defined as "pre-generated," whereby no parameters are accepted and the actual report to be generated has been previously generated and is waiting to be delivered to users requesting it. In this case, "pre-generated" reports are stored in some location (such as MVS) that allows access to the reports from the reports catalog.

Once the user selects and enumerates their parameter selection and delivery option, a request report action is enabled to allow the user to start the report generation process. At this point, a message is formed to match their report request and is processed, resulting in the report being generated (or in the case of "pre-generated" reports, the report is merely returned back to the user). Once the report is generated, the results are attached to the document that represents the user's request. The request document can then be used to launch the viewing of the report (as well as being used to request the same reports again at a later date).

Preferably, the user is able to request reports while not connected to any network, and to receive their reports back upon reconnection to the network. The catalog function supports report developers in defining, categorizing and implementing their reports. Business users can then select (based on the categorization and a graphical depiction) and request these reports, providing report parameter values which have been secured by individual users. The invention supports the separation between the business report and how it is implemented, allowing reports of any type/technology to be represented and requested in a single report catalog. Reports can be requested and returned to the user in several formats.

With this invention, an end user is able to see all of the reports available, and to submit a report request from the catalog if that report is available to the user (based on the access granted to the user). This report request may be used to indicate what parameters they would like to use in generating the report, and to indicate how they would like the report delivered back to them. Further, the end user is able to store reports and parameter definitions as documents, such as Lotus Notes documents.

As will be understood by those of ordinary skill in the art, the present invention may be carried out on any suitable computer or computer network. FIG. 5 illustrates, as an example, a computer of a type that may be used in the practice of this invention. Viewed externally in FIG. 5, a computer system has a central processing unit 42 having disk drives 44A and 44B. Disk drive indications 44A and 44B are merely symbolic of a number of disk drives that might be accommodated by the computer system. Typically, these would include a floppy disk drive such as 44A, a hard disk drive (not shown externally) and a CD ROM drive indicated by slot 44B. The number and type of drives vary, usually, with different computer configurations. The computer has the display 46 upon which information is displayed. A keyboard 50 and a mouse 52 are normally also available as input devices.

FIG. 6 shows a block diagram of the internal hardware of the computer of FIG. 5. A bus 54 serves as the main information highway, interconnecting the other components of the computer. CPU 56 is the central processing unit of the system, performing calculations and logic operations required to execute programs. Read only memory 60 and random access memory 62 constitute the main memory of the computer. Disk controller 64 interfaces one or more disk drives to the system bus 54. These disk drives may be floppy disk drives, such as 66, internal or external hard drives, such as 70, or CD ROM or DVD (Digital Video Disks) drives, such as 72. A display interface 74 interfaces a display 76 and permits information from the bus to be viewed on the display. Communications with external devices can occur over communications port 78.

Figure 7:
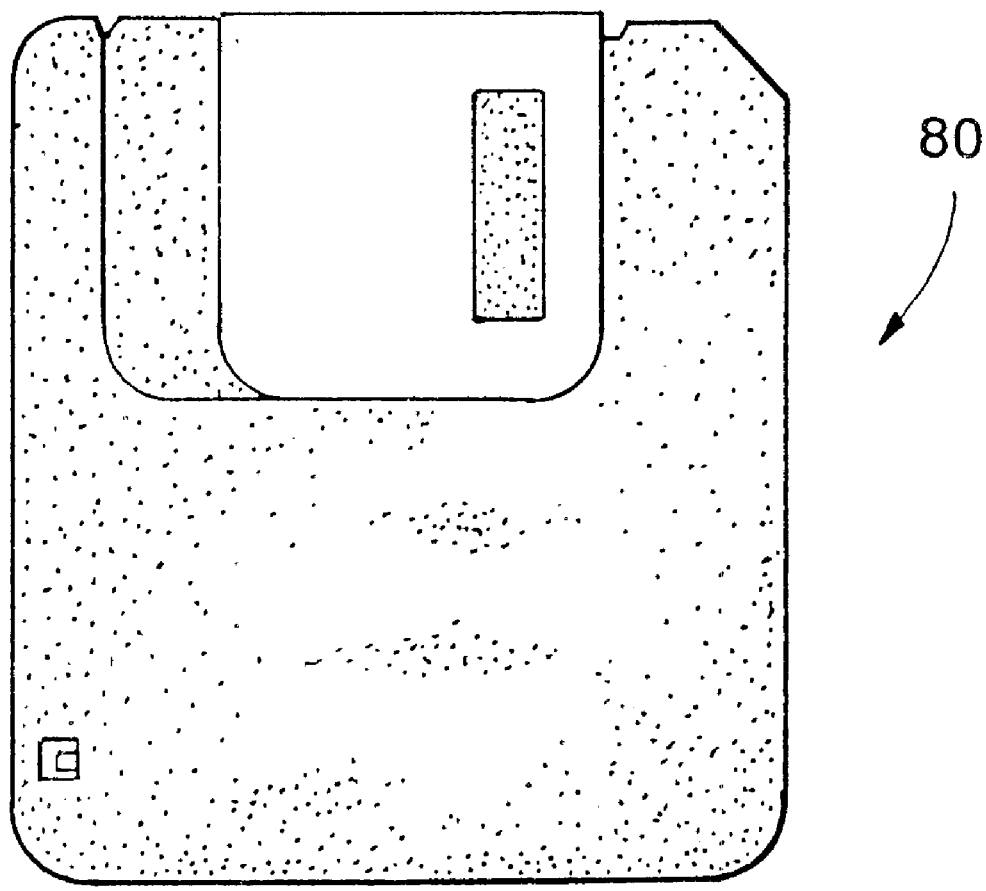
FIG. 7 illustrates a memory medium that can be used to hold a computer program for carrying out this invention.

FIG. 7 shows a memory medium 80 that may be used to hold a computer program for implementing the present invention, and this medium may be used in any suitable way with any appropriate computer to carry out the invention. Typically, memory media such as a floppy disk, or a CD ROM, or a Digital Video Disk will contain the program information for controlling the computer to enable the computer to perform its functions in accordance with the invention.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A report catalog tool, comprising:
   a distributable database having one or more documents, each said document representing
   a report;
   attributes for said report indicating a location where logic resides for said report and a data source to be used for said report;
   means for presenting a user with a catalog of available reports;
   means for enabling the user to request one of the reports from the catalog;
   means for allowing the user to configure the requested report;
   means for formatting said order as a transaction on a target system at said location and using said data source; and
   means for running said transaction to generate said requested report and to return said requested report to said user.

2. A report catalog tool according to claim 1, wherein the means for allowing a user to order and configure a requested report includes means to receive report parameters and a report format request from the user.

3. A report catalog tool according to claim 2, wherein the means to receive input parameters includes means to provide a prompt list of predetermined parameters.

4. A report catalog tool according to claim 1, wherein the means for running the transaction includes means to obtain from the data source data needed to generate the report.

5. A report catalog tool according to claim 1, wherein the means for presenting the user with the catalog of available reports includes:
   means for identifying general types of available reports;
   means for enabling the user to select one of said general types of available reports; and
   means, acting in response to the selecting of one of said general types of reports, for presenting the user with a list of specific types of available reports.

6. A report catalog tool according to claim 1, wherein the means for running includes:
   a queue manager having access to said data source; and
   means for sending the transaction to the queue manager.

7. A method for selecting and requesting a report from a catalog of standardized reports, comprising the steps of:
   providing a distributable database having one or more documents, each of said documents representing a report;
   providing attributes for each of said reports indicating a location where logic resides for said report and a data source to be used for said report;
   presenting a user with a catalog of available reports;
   the user requesting one of the reports from the catalog;
   the user configuring the requested report;
   formatting said order as a transaction on a target system at said location and using said data source; and
   running said transaction to generate said requested report and to return said requested report to said user.

8. A method according to claim 7, wherein the allowing step includes the step of receiving report parameters and a report format request from the user.

9. A method according to claim 8, wherein the receiving step includes the steps of providing a prompt list of predetermined parameters.

10. A method according to claim 7, wherein the running step includes the step of obtaining from the data source data needed to generate the report.

11. A method according to claim 7, wherein:
    the running step includes the step of transmitting the order over a network to generate the requested report; and
    the allowing step includes the step of allowing the user to order and configure the requested report while disconnected from the network.

12. A method according to claim 7, wherein the presenting step includes the steps of:
    identifying to the user general types of available reports;
    the user selecting one of said general types of available reports; and
    in response to the selecting of one of said general types of reports, presenting the user with a list of specific types of available reports.

13. A method according to claim 7, wherein the running step includes the steps of:
    providing a queue manager having access to said data source; and
    sending the transaction to the queue manager.

14. A method according to claim 7, wherein the target system is selectively connected to the user via a defined network, and wherein:
    the step of the user requesting one of the reports occurs while the user is not connected to the network, and
    the step of running said order includes the step of running said order to the target system when the user is reconnected to the network.

15. A program storage device readable by machine, tangibly embodying a program of instructions executable by the machine to perform method steps for selecting and requesting a report from a catalog of standardized reports, said method steps comprising:
    providing a distributable database having one or more documents, each of said documents representing a report;

providing attributes for each of said reports indicating a location where logic resides for said report and a data source to be used for said report;

presenting a user with a catalog of available reports;

the user requesting one of the reports from the catalog;

the user configuring the requested report;

formatting said order as a transaction on a target system at said location and using said data source; and running said transaction to generate said requested report and to return said requested report to said user.

16. A program storage device according to claim 15, wherein the allowing step includes the step of receiving report parameters and a report format from the user.

17. A program storage according to claim 16, wherein the receiving step includes the steps of providing a prompt list of predetermined parameters.

18. A program storage device according to claim 15, wherein the running step includes the step of obtaining from the data source data needed to generate the report.

19. A program storage device according to claim 15, wherein:

the running step includes the step of transmitting the order over a network to generate the requested report; and the allowing step includes the step of allowing the user to order and configure the requested report while disconnected from the network.

* * * * *